(12) United States Patent
Yuen et al.

(10) Patent No.: US 8,543,246 B2
(45) Date of Patent: Sep. 24, 2013

(54) CONTROLLING DISTRIBUTION OF ELECTRICAL POWER

(75) Inventors: Cherry Yuen, Baden (CH); Andrew Paice, Dättwil (CH); Mats Larsson, Baden-Dättwil (CH); Christian Frei, Fislisbach (CH)

(73) Assignee: ABB Research Ltd., Zurich (CH)

( * ) Notice: Subject to any disclaimer, the term of this patent is extended or adjusted under 35 U.S.C. 154(b) by 368 days.

(21) Appl. No.: 12/671,365

(22) PCT Filed: Jul. 17, 2008

(86) PCT No.: PCT/EP2008/059347
§ 371 (c)(1),
(2), (4) Date: Mar. 30, 2010

(87) PCT Pub. No.: WO2009/016038
PCT Pub. Date: Feb. 5, 2009

(65) Prior Publication Data
US 2010/0204851 A1   Aug. 12, 2010

Related U.S. Application Data

(60) Provisional application No. 60/935,173, filed on Jul. 30, 2007.

(30) Foreign Application Priority Data

Mar. 10, 2008 (EP) .................................. 08152501

(51) Int. Cl.
| | |
|---|---|
| G01R 15/00 | (2006.01) |
| G01R 21/00 | (2006.01) |
| G05B 11/01 | (2006.01) |
| G05D 17/00 | (2006.01) |
| G05F 5/00 | (2006.01) |
| G08B 21/00 | (2006.01) |
| H02H 7/00 | (2006.01) |

(52) U.S. Cl.
USPC ............ 700/286; 700/22; 700/295; 700/297; 323/299; 340/657; 340/662; 340/664; 361/65; 702/57; 702/60; 702/62

(58) Field of Classification Search
USPC ................... 700/22, 286, 295, 297; 323/299; 340/657, 662, 664; 361/65; 702/57, 60, 702/62
See application file for complete search history.

(56) References Cited

U.S. PATENT DOCUMENTS 4,075,699 A * 2/1978 Schneider et al. ............ 700/291
4,181,950 A * 1/1980 Carter, II ....................... 700/291
(Continued)

FOREIGN PATENT DOCUMENTS

| WO | WO 00/48284 A1 | 8/2000 |
|---|---|---|
| WO | WO 00/48288 A1 | 8/2000 |

OTHER PUBLICATIONS

International Preliminary Report on Patentability (Form PCT/IB/373) issued by the International Bureau of WIPO, Feb. 2, 2010, in PCT/EP2008/059347 and accompanying Written Opinion (Form PCT/ISA/237) issued by the European Patent Office.

(Continued)

*Primary Examiner* — Mohammad Ali
*Assistant Examiner* — Jennifer L Norton
(74) *Attorney, Agent, or Firm* — Buchanan Ingersoll & Rooney PC

(57) ABSTRACT

The present disclosure is concerned with controlling distributing of electrical power in a power distribution region. To effectively control the distribution of power in the distribution region, the substation of the region is provided with a distribution controller or Intelligent Substation Control System (ISCS). The distribution controller is connected to various process devices, which in turn are connected to primary devices of the region. The process devices send data corresponding to the primary devices to the distribution controller, and the distribution controller includes a processor which proposes a set of actions based on the received data. Further, the distribution controller includes a coordinating device which selects the final action from the set of proposed actions. The final action is implemented on the primary devices of the distribution region.

7 Claims, 3 Drawing Sheets

(56) References Cited

U.S. PATENT DOCUMENTS

| | | | |
|---|---|---|---|
| 4,419,589 A * | 12/1983 | Ross | 307/39 |
| 4,549,274 A * | 10/1985 | Lerner et al. | 700/295 |
| 5,436,510 A * | 7/1995 | Gilbert | 307/38 |
| 5,517,421 A * | 5/1996 | Jimbo et al. | 716/103 |
| 6,961,641 B1 * | 11/2005 | Forth et al. | 700/295 |
| 7,206,670 B2 * | 4/2007 | Pimputkar et al. | 700/291 |
| 7,373,222 B1 * | 5/2008 | Wright et al. | 700/295 |
| 7,532,955 B2 * | 5/2009 | Dougherty | 700/286 |
| 8,327,170 B2 * | 12/2012 | Boss et al. | 713/320 |
| 2003/0067725 A1 | 4/2003 | Horvath et al. | |
| 2003/0187550 A1 * | 10/2003 | Wilson et al. | 700/295 |
| 2004/0267395 A1 * | 12/2004 | Discenzo et al. | 700/99 |
| 2006/0230201 A1 * | 10/2006 | Fromherz et al. | 710/62 |

OTHER PUBLICATIONS

International Search Report for PCT/EP2008/059347 completed Nov. 6, 2008.
Written Opinion for PCT/EP2008/059347 completed Nov. 6, 2008.
European Search Report for EP 08152501.6 completed Nov. 5, 2008.
International Search Report for PCT/EP2008/059343 completed Nov. 5, 2008.
ABB: MicroSCADA Pro, DMS 600 *4.1: Operation Manual, Feb. 28, 2005, pp. 48-49, pp. 127-131.
ABB: MicroSCADA Pro for Substation Automation; Innovation from ABB, 2006, pp. 2-6.
Booth C. et al., Enhanced Power System Control and Management Via Intelligent Substations, 2nd International Conference on Advances in Power System Control, Operation and Management, Dec. 1993, Hong Kong, pp. 542-547.
Per Lund, The Danish Cell Project—Part 1: Background and General Approach, Power Engineering Society General Meeting, Jun. 2007, pp. 1-6.
ABB: COM600 Station Automation Series, COM600 3.2 User's Guide, Oct. 16, 2006, pp. 11-20, pp. 32-47.
ABB: MicroSCADA Technology Rev. 8.4.2: Application Objects, 1. Introduction, Sep. 18, 1998, pp.
ABB: MicroSCADA Technology Ref. 8.4.2: Application Objects, 3. Process Objects, Sep. 18, 1998, pp. 1-15, pp. 20-23.
ABB: MicroSCADA Technology Ref. 8.4.2: Application Objects, 8. Event Channels, Sep. 18, 1998, pp. 1-2.
Wu Y. et al., Automatic simulation of IED measurements for substation data integration studies, Power Engineering Society General Meeting, 2005, pp. 1-6.

* cited by examiner

CONTROLLING DISTRIBUTION OF ELECTRICAL POWER

FIELD OF THE INVENTION

The invention relates to the field of electrical power distribution. It departs from a distribution controller for controlling distribution of electrical power as described in the preamble of claim 1.

BACKGROUND OF THE INVENTION

A power distribution system is the interface between the power transmission network and the electricity end-customers. Typically the power distribution system comprises a number of primary substations which are connected to secondary substations via power lines and switches. The primary substations contain transformers that reduce the voltage from the HV level of the transmission or sub-transmission grid down to MV levels suitable for regional transmission. Distribution level network control involves pieces of secondary equipment interacting with the primary equipment of the substations and power lines, i.e. switches, tap changers, capacitor banks and the like. Distribution areas, regions or cells are assigned to one single primary substation and defined by electrically unambiguously connected primary equipment (tree or feeder structure). However, a distribution area is subject to changes during reconfiguration of network topology, potentially leading to a discrepancy between the distribution area and a virtual domain of associated secondary equipment. In addition, distributed generation of electric power on lower voltage levels of the distribution system generates some considerable coordination tasks for distribution level network control.

By way of example, the paper by Per Lund entitled "The Danish Cell Project—Part 1: Background and General Approach", IEEE 2007, Power Engineering Society General Meeting, June 2007, describes a Cell Controller Pilot Project which aims at developing a new solution for optimal management and active grid utilisation of the large amount of distributed generation present in Western Denmark. For this purpose, the 60 kilo Volt (kV) network parts below each 150/60 kV transformer at the primary substations are operated as radial networks by opening a sufficient number of 60 kV line breakers in selected substations and thus sectioning the otherwise meshed networks of the 60 kV distribution systems. Each of these radially operated 60 kV networks then defines a 60 kV distribution cell, to be controlled by a fully automated cell controller with a number of functions and a link to the Supervisory Control And Data Acquisition (SCADA) system at the Network Control Centre (NCC) of the Distribution Network Operator (DNO).

Cell or distribution controllers, also termed Intelligent Substation Control Systems (ISCS) or Distribution Intelligent System Controllers (DISC), may comprise one or several physical devices and are generally located in a primary substation of a distribution area. An ISCS is capable of functioning as a substation gateway to the NCC by providing gateway functions for mapping signals between secondary equipment for protection and control and higher-level systems. In particular, it is able to translate internally the process data from various master protocols into a standard protocol, e.g. the IEC 61850 standard data model, and to translate the data from the standard data model into one of the common slave protocols.

By way of example, an ISCS is connected through the existing communication infrastructure to an NCC, the two communicating via a tele-control protocol of the master-slave type, for instance IEC 60870-5-101. A number of other protocols, such as SPA, LON-LAG and IEC 60870-5-103, are used to connect the ISCS to the secondary or process devices for protection and control purposes. On the other hand, the IEC 61850 standard protocols are client-server based, which allows several clients to access data from a same server. They define the semantics of the data within the substation in a standardized object-oriented way, and offer a standardized method to transfer data between different engineering tools in a standardized format.

DESCRIPTION OF THE INVENTION

It is an objective of the invention to optimize a distribution of electric power. This objective is achieved by a distribution controller according to claim 1 and a method of controlling distribution of electrical power according to claim 7. Further preferred embodiments are evident from the dependent patent claims.

According to the invention, a distribution controller for controlling a distribution of electrical power in a first power distribution region or cell assigned to the controller is adapted to be connected to process or secondary devices of a first control domain. These secondary devices, such as substation Intelligent Electronic Devices IEDs and Remote Terminal Units RTUs, in turn interact with primary devices of the assigned first region. The controller comprises processing means for processing and evaluating data from the process devices connected to the controller. The processing means implement application function algorithms and/or Logical Nodes according to IEC 61850, and derive and propose actions or commands related to, and to be executed by, primary devices of the assigned first region. The distribution controller further comprises coordinating means implementing logical algorithms or criteria for coordinating the proposed actions or commands prior to their execution by the primary device. Coordination in this context is understood to comprise prioritizing, ranking, conflict resolving, or any other type of well-reasoned decision.

The abovementioned application function algorithms comprise advanced and complex routines for e.g. loss minimization, voltage control, and congestion management, which are triggered by certain online variables exceeding predetermined thresholds and/or otherwise violating particular operating constraints. The corresponding actions or commands comprise control, management or optimization commands on a time scale of 100 ms, or a change of parameter settings related to these commands, or a change of protection settings. The operating states of power systems nowadays are becoming less predictable, because of the increase in complexity of the networks resulting from new regulations, rapid expansion of the network structure, the integration of renewable intermittent power generation such as wind or PV, as well as changed demand patterns due to the influence of the energy markets. This increased unpredictability may ultimately cause the different application function algorithms to propose diverging measures.

Hence, where ever contradicting, competing or otherwise overlapping requirements regarding the operation of a power distribution system result from a processing of process data as provided by the process devices, a separate coordination step is invoked. The coordination criteria may depend on the operating conditions of the power distribution system and/or the distribution controller, and can be determined and adapted independently, based e.g. on predetermined or dynamically updated considerations or inputs from neighbouring distribution regions or cells of the power distribution system, ultimately resulting in a further optimized operation of the latter as well as an efficient use of computing resources.

In a first distribution controller according to the invention, intra-region-wide coordination or decision-making is implemented as a coordinating means that is consulted whenever contradicting actions are or may be proposed. The coordinating means revert to a criterion such as a prioritizing or ranking order for selecting the specific application function algorithm of which the proposal will be executed, or discarded. Hence, the actions proposed by the processing means by evaluating a number of pre-defined application functions are coordinated, in case they require a supervisory intervention, by consulting a table or index indicating, for any particular combination of proposals, on how to proceed.

In a preferred variant, the coordinating means includes a conflict resolution capability for coordinating the proposed actions based on past operating experiences. To that purpose, a historian database stores a number of previously encountered operating conditions and corresponding executed actions of the targeted primary devices, such as e.g. a switch operation history. From these, conclusions are drawn and consolidated into the table or index, and applied to any present situation resembling the previous operating conditions.

In a further preferred variant, the ranking order evaluates the possible causes of the diverging actions, i.e. a type and/or amplitude of the constraint violation. The type involves both the physical quantity exceeding its threshold as well as the piece of equipment concerned, thus distinguishing primary devices of the same kind, such as two lines both suffering from voltage or flow constraint violation. The amplitude is either an absolute or relative value, and may be combined or otherwise evaluated in conjunction with a weight assigned to the type.

In a second embodiment of the invention, a first distribution controller is adapted to communicate, either directly via optical channels or indirectly via a data concentrator in a higher hierarchy level or NCC, with a second or peer distribution controller assigned to a second or neighbouring region. The first controller may then receive actions or commands on behalf of a primary device of the first region derived by the processing means of the second controller. Likewise, the coordinating means of the first controller may coordinate proposed actions based on input from the second controller. Decision-supporting input from the second controller can be voltage or load measurements, or any other quantity assessed by a process device of the second domain, or an answer to an explicit question or request of the first controller. By thus extending the coordinating activity beyond the first region, operational performance and active network management of a multi-region power distribution system is improved.

In a further embodiment, a first distribution controller is adapted to communicate with a process device that in turn is interacting with a primary device of the first region assigned to the first controller, but is directly connected to a second distribution controller. This enables the first controller to obtain, via the second controller, necessary data input to its processing means, e.g. following a reconfiguration of the power network and a corresponding re-assignment of said primary device from a second region to the first region. In other words, the cases where a distribution region, defined by the primary devices connected to the primary substation, is different from the control domain, defined by the secondary devices connected to the distribution controller, are anticipated.

In a method of controlling distribution of electrical power over a power distribution network comprising a number of primary devices assigned to at least two non-overlapping distribution regions, and at least two distribution controllers connected to process or secondary devices which in turn interact with primary devices in the respective distribution region, the following two steps are performed:

Deriving, by a processing means of the first controller implementing application function algorithms or Logical Nodes and based on data from process devices connected to the controller, control, management or optimization commands related to and to be executed by a primary device of the assigned first region, and Coordinating the actions based on decision-supporting input from the second or neighbouring distribution controller by a coordinating means of the first controller implementing logical algorithms. Here, the decision-supporting input is preferably communicated between the two controllers via a dedicated fibre-optic link.

The present invention also relates to a computer program product including computer program code means for controlling one or more processors of a distribution controller connected to process devices of an electrical power distribution region, particularly, a computer program product including a computer readable medium containing therein the computer program code means.

BRIEF DESCRIPTION OF THE DRAWINGS

The subject matter of the invention will be explained in more detail in the following text with reference to preferred exemplary embodiments which are illustrated in the attached drawings, in which.

The reference symbols used in the drawings, and their meanings, are listed in summary form in the list of reference symbols. In principle, identical parts are provided with the same reference symbols in the figures.

DETAILED DESCRIPTION OF PREFERRED EMBODIMENTS

Figure 1:
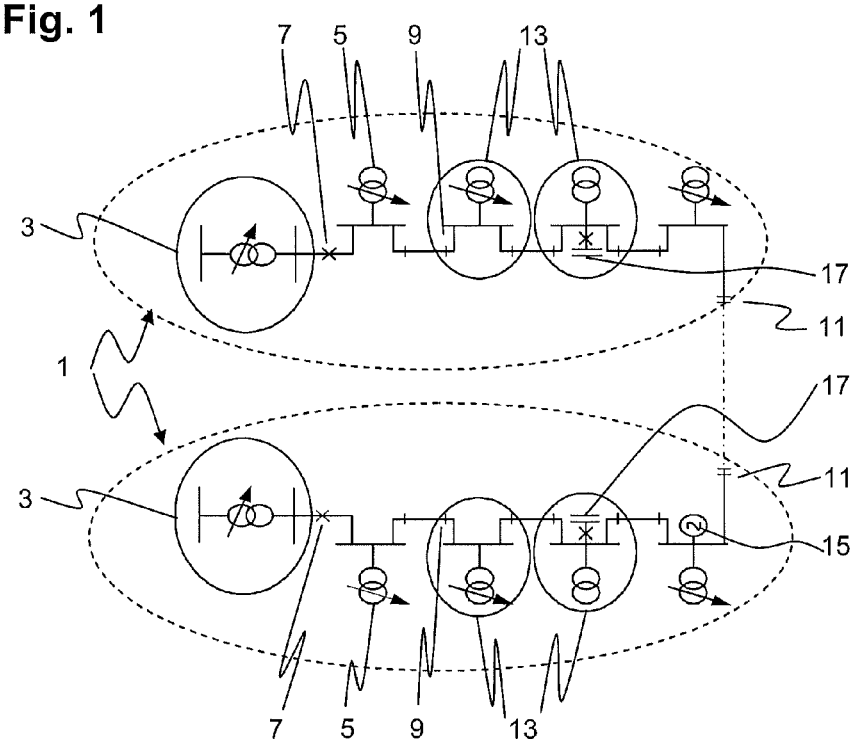
FIG. 1 schematically shows a power transmission network.

FIG. 1 illustrates an exemplary power distribution system comprising two distribution areas 1 with primary substations 3 which are connected to secondary substations 13 via power lines and switches. The primary substations contain transformers that reduce the voltage from the HV level of the transmission or sub-transmission grid (not shown) down to MV levels suitable for regional transmission. In the secondary substations 13 tap changing transformers in turn connect customers or LV feeders (not shown) to the MV level. The system comprises a plurality of primary devices, such as controlled transformers 5, circuit breakers 7, switches 9 (open) and 11 (closed), power sources for distributed generation 15 and controlled capacitors 17. Distribution level network control involves pieces of secondary equipment (not shown) interacting with the aforementioned substations, power lines, and other primary devices.

Placed in the ends of the lines between secondary substations there are switches 11 which can be used to reconfigure the network. Distribution areas, regions or cells 1 are assigned to one single primary substation and defined by electrically unambiguously connected primary equipment (tree or feeder structure). Hence, upon a reconfiguration of the power distribution system by opening the closed switches 11 and closing one of the open switches 9, the two distribution regions 1 in FIG. 1 will become quite distinct.

Figure 2:
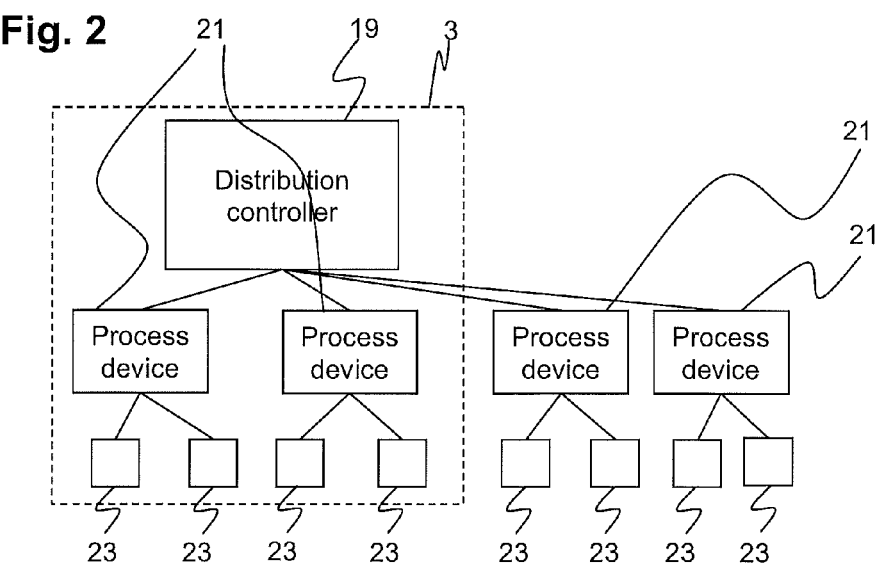
FIG. 2 depicts functional blocks of a primary substation.

FIG. 2 shows a schematic structure of a distribution level network control comprising a distribution controller 19 arranged in primary substation 3 and connected to four process devices 21, wherein each of the process devices 21 is in turn connected to a plurality of primary devices 23. The distribution controller 19 is an Intelligent Substation Control System (ISCS), which is capable of performing many network control and management functions. It collects data from the process devices 21 and takes decisions regarding the change of states of the primary devices 23. For example, the distribution controller 19 may decide the state of the circuit breakers 7 in the power distribution region 1 based on the data it gathers from the process devices 21. Examples of the process devices 21 include, but are not limited to, Intelligent Electronic Devices (IEDs) and Remote Terminal Units (RTUs). These devices communicate with the primary devices 23 as well as the distribution controller 19. For example, they may transfer data from the primary devices 23 to the distribution controller 19, as well as communicate the decision of the distribution controller 19 to the primary devices 23.

With the necessary data, the distribution controller 19 can perform various control and management functions. Examples of network control functions are voltage control, network restoration and network reconfiguration, while examples of network management functions are generation constraint management, network loss reduction and asset management. The distribution controller 19 also performs various optimization functions related to the power distribution region 1. Further, since the distribution controller 19 is responsible for reliable distribution of power to regions corresponding to the primary substation 3, it works on a fast time scale ranging from seconds to minutes and performs various optimization functions. These fast time scale functions can be, for example, adapting dynamically the switch configuration when the network is de-energized due to a fault in the transmission lines. This helps in restoring power to as many customers as possible in a shortest possible time. The distribution controller 19 can also adapt the settings of other local controllers, based on the selected switch state, and the current load pattern and operating state of the distributed generation 15. The distribution controller 19 is also responsible for coordinating the actions of various other distribution controllers to control the voltage and reactive power flow.

Further, the distribution controller 19 adapts protection settings of the primary devices 23, based on switch configuration and the connection/disconnection state of the distributed generation 15. In cases where there are load variations in the power distribution region 1, the distribution controller 19 is configured to adapt the switch configuration and use demand side management or energy storage devices such that the capacity restrictions of all network components are fulfilled.

The abovementioned functions are performed by the distribution controller 19 when it is working on a fast time scale. When the distribution controller 19 is working on a slower time scale of hours to weeks, it is responsible for condition monitoring and asset life prolongation. For this, the distribution controller 19 adapts the default switch configuration for the normal state operation of the power transmission network. Here, the normal state operation of the network refers to the state of the network when there are no faults in the transmission lines or any other network components. The slower time scale working of the distribution controller 19 is performed to achieve minimum operation loss and to minimize the impact of faults in the network. This may be done by estimating the probability of a fault and its consequences in economic terms. The distribution controller 19 may make use of inputs from a condition assessment system to minimize the total risk.

Figure 3:
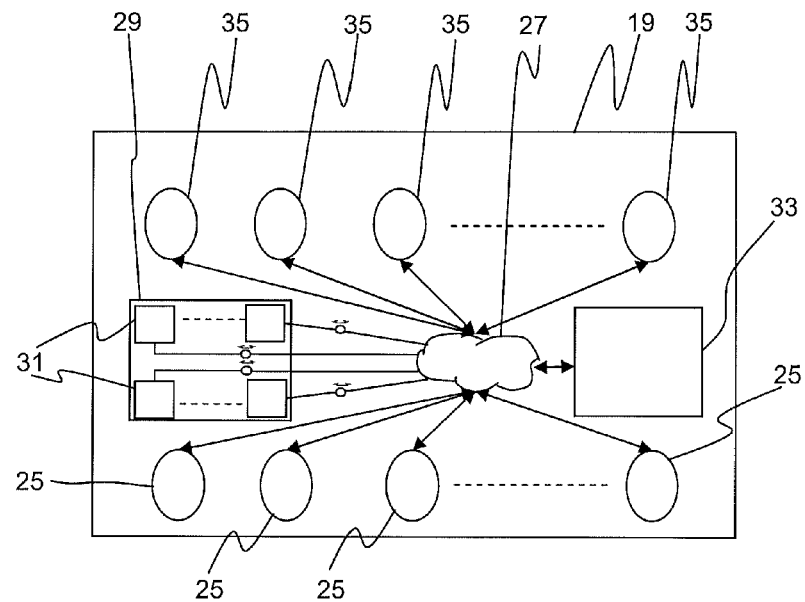
FIG. 3 shows architecture of a distribution controller.

FIG. 3 depicts the detailed architecture of the distribution controller 19. By using a communication infrastructure, the distribution controller 19 can collect and send data from/to the process devices 21 in its assigned domain, data from/to the Network Control Center (NCC), and data from/to other distribution controllers located in other substations. The process devices 21 transfer necessary data from the primary devices 23 to the distribution controller 19 by first gathering the data from the primary devices 23 and then sending it to the distribution controller 19. At the distribution controller 19, master-protocol translators 25 translate various communication protocols used by the process devices 21 for data transfer, into a standard protocol. This has the advantage that the functionality of the distribution controller 19 becomes independent of the communication model or protocol used in the distribution network. After conversion to a standard protocol, the necessary data is sent to a Common Data Model (CDM) or server 27.

The necessary data resides in a temporary data storage or abstract data space 27 and can be used by processing means 29. The processing means 29 can obtain the necessary data through symmetrical 'request and response' and/or 'periodic updating' method of communication. After receiving the data, the processing means 29 propose decisions or 'actions' that are to be implemented at the primary devices 23. The processing means 29 includes a plurality of algorithms 31 that process the necessary data and propose a set of actions. Examples of the algorithms 31 include, but are not limited to, control algorithms, Optimal Power Flow algorithms and the like. Further, the set of proposed actions are communicated via the temporary data storage 27 to the coordinating means 33.

After receiving the proposed set of actions, the coordinating means 33 decides the 'final' action that needs to be implemented at the primary devices 23. In cases of conflicts between different proposed actions, the coordinating means 33 decides the final action based on the priority of the algorithms 31 proposing the actions. For example, when two algorithms propose actions that are contradictory to each other, like one proposing opening a particular switch and the other proposing closing the switch, the coordinating means 33 takes the final decision based on the priority of the two competing algorithms. Further, the priority of the algorithms 31 may also be changed dynamically based on the operation conditions of the power system and the distribution controller 19. The coordinating means 33 may also utilize additional information from a historian database to make the final decision. The additional information from the historian database can be, for example, switch operation history of a primary device in the network. In accordance with an embodiment of the present invention, the historian database may be included in an external storage device, which can be accessed by distribution controller 19 by using a communication interface, in case the local storage of the controller is not sufficient.

In addition to the components described above, the distribution controller 19 also includes slave-protocol translators 35, which are communicably connected to the temporary data storage 27 and an external network controller at a higher hierarchy level, like NCC. Similar to the master-protocol translators 25, the slave-protocol translators 35 facilitate communication between the NCC and the distribution controller 19 by translating data from the standard protocol of the distribution controller 19 to a suitable communication protocol used by the NCC, and vice-versa.

The functionality of the distribution controller 19 comprises an abstract model of the network and associated devices by use of the temporary data storage 27. In the temporary data storage 27, each network element is represented by an abstract CDM object, residing in a controller software operating the distribution controller 19. These CDM objects contain a mirror copy of the necessary data that process devices associated with the distribution controller 19 provide. Further, whenever any control operation is carried out or a decision is made, the corresponding CDM object is updated and the associated process device is automatically notified and ordered to carry out the operation. Also, whenever new data is available at the process devices, the new data is automatically sent to the controller and relevant CDM objects are updated. This abstract model makes the control functionality independent of the communications models and protocols used in various networks.

Figure 4:
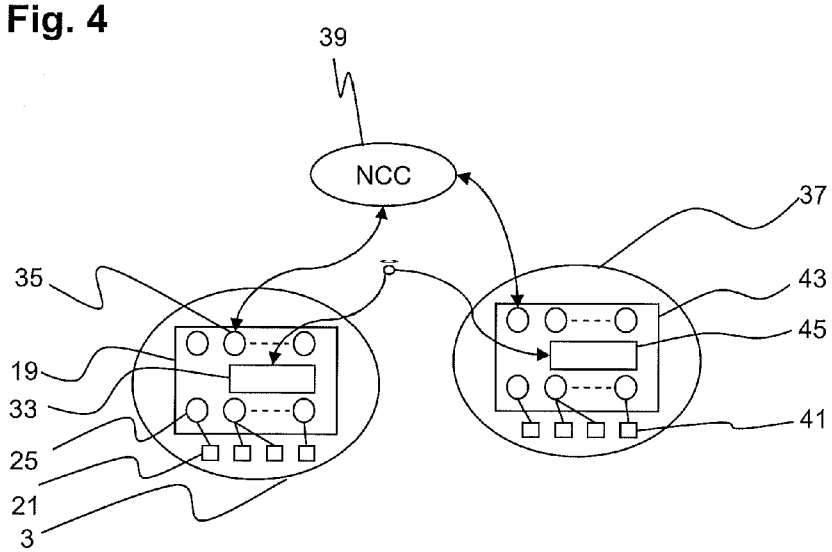
FIG. 4 illustrates a power substations network.

FIG. 4 illustrates a power transmission network in detail having substations 3 and 37 and an NCC 39. By using a communication infrastructure the distribution controller 19 in the substation 3 is able to transfer data from/to the distribution controller 43 in the substation 37 and/or the NCC 39. Through the necessary data exchange and coordination among these distribution controllers located in different substations, the network operation done by these controllers can be optimized for the whole region.

Within a distribution controller, for example the controller 19, the coordinator 33 is responsible for communication among process devices 21 within the substation 3, as well as process devices 41 within the substation 37. The coordinating means 33 can use the necessary data from the process devices 21 and/or decision support input from the distribution controller 43 to take a final operation decision. The decision support input can be, for example, historian data or necessary data from the process devices 41. Further, the coordinators at different substations have the same rights, by default, however, in some circumstances; one/several of them can have more decision rights than others. For example, there may be a case that distribution controller 19 has more rights than distribution controller 43, and can thus reject any suggestion or data sent by the distribution controller 43.

Referring to FIG. 4, the distribution controller 19 in the substation 3 can communicate with the distribution controller 43 in the substation 37 by using a dedicated link, like an optical channel, or through a data concentrator in a higher hierarchy or NCC 39. Communication between the NCC 39 and the distribution controller 19 is done via the slave-protocol translators 35. The distribution controllers 19 and 43 can also communicate directly through their respective coordinating means 33 and 45. The coordinating means 33 and 45 communicate with each other through symmetric 'request and response' and/or 'periodic updating' method of communication.

Figure 5:
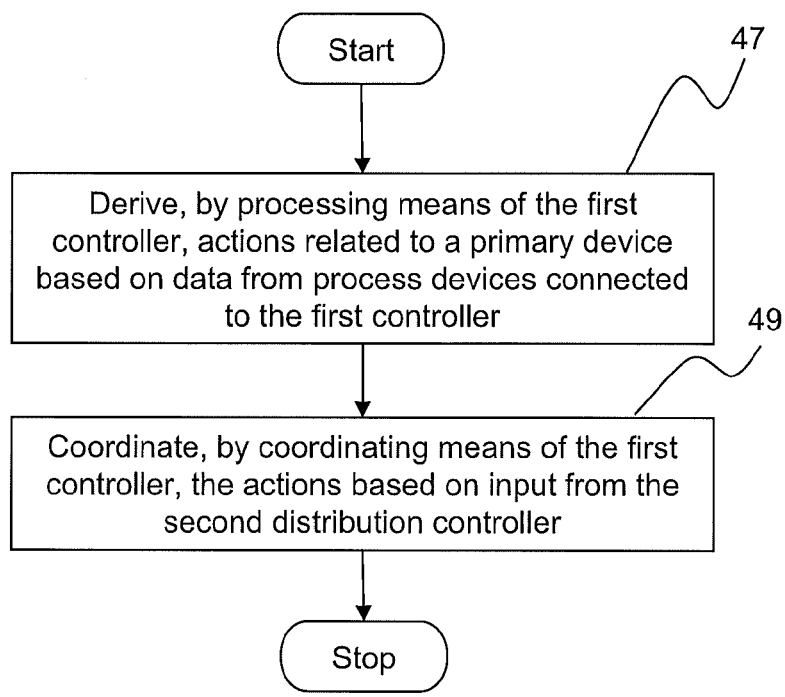
FIG. 5 is a flowchart illustrating a method for controlling distribution of electrical power over a power distribution network.

FIG. 5 is a flowchart illustrating a preferred method for controlling distribution of electrical power over the power distribution system. As an example, the power distribution system can have two distribution regions, corresponding to the substations 3 and 37. Each of the substations 3 and 37 includes a distribution controller, like the distribution controllers 19 and 43, which are further connected to process devices 21 and 41.

At step 47, actions that are to be performed on the primary devices of the first distribution region are proposed by the processing means 29 of the distribution controller 19. The actions are proposed based on the data obtained from the process devices 21. At step 49, actions proposed by the processing means 29 are coordinated by the coordinating means 33, based on inputs or data provided by the distribution controller 43 of the second distribution region. For communicating, the distribution controllers 19 and 43 use a dedicated link or the NCC 39.

LIST OF DESIGNATIONS 1 power distribution region
3 primary substation
5 controlled transformer
7 circuit breaker
9 switch (open)
11 switch (closed)
13 secondary substation
15 distributed generation
17 controlled capacitor
19 distribution controller or ISCS
21 process device
23 primary device
25 master-protocol translator
27 temporary data storage
29 processing means
31 algorithm
33 coordinating means
35 slave-protocol translator
37 second substation
39 NCC
41 process device of substation 37
43 distribution controller of substation 37
45 coordinating means of substation 37
47 first flowchart step
49 second flowchart step

The invention claimed is:

1. A first distribution controller for controlling a distribution of electrical power in a first power distribution region, wherein the first distribution controller is configured to communicate with a second distribution controller assigned to a second power distribution region distinct from the first power distribution region, and wherein the first distribution controller comprises:

processing means for processing data received from process devices connected to the first distribution controller, the process devices connected to the first distribution controller being configured to interact with at least one primary device of the first power distribution region, and for proposing actions related to the at least one primary device of the first power distribution region based on the received data; and coordinating means for coordinating conflicting actions in the event of conflicting proposed actions, the coordinating means being configured to at least one of:

coordinate conflicting actions related to the at least one primary device and proposed by the processing means of the first distribution controller, based on a decision supporting input from the second distribution controller, and coordinate conflicting actions related to the at least one primary device and proposed by at least one of the processing means of the first distribution controller and a processing means of the second distribution controller.

2. The distribution controller according to claim 1, wherein the coordinating means are adapted to coordinate the proposed actions based on a prioritizing or ranking order.

3. The distribution controller according to claim 2, wherein the prioritizing or ranking order is based on an operating history of the primary device.

4. The distribution controller according to claim 2, wherein the prioritizing or ranking order takes into account at least one of a type and amplitude of a constraint violation causing the proposed actions.

5. The distribution controller according to claim 1, wherein the distribution controller is configured as a first distribution controller which is configured to communicate with a second distribution controller assigned to a second region distinct from the first power distribution region, and
wherein the first distribution controller is configured to communicate with a process device connected to the second controller.

6. A method of controlling distribution of electrical power over a power distribution system comprising first and second distribution regions and first and second distribution controllers connected to process devices which in turn interact with primary devices in a corresponding one of the distribution regions, respectively, the first distribution controller being configured to communicate with the second distribution controller assigned to the second power distribution region assigned to the second power distribution region distinct from the first power distribution region, the method comprising:

processing, by a processing means of the first distribution controller, data received from process devices connected to the first distribution controller, the process devices connected to the first distribution controller being configured to interact with a primary device of the first power distribution region based on the received data;

deriving, by the processing means of the first distribution controller, actions related to the primary device of the first power distribution region based on the received data; and coordinating, by a coordinating means of the first distribution controller, the actions in the event of conflicting derived actions, the coordinating comprising at least one of:

coordinate conflicting actions related to the primary device and proposed by the processing means of the first distribution controller, based on a decision supporting input from the second distribution controller, and coordinate conflicting actions related to the primary device and proposed by at least one of the processing means of the first controller and a processing means of the second distribution controller.

7. The method according to claim 6, comprising:

communicating between the first and second distribution controllers via a dedicated link or via a Network Control Centre of the power distribution system.

* * * * *